(12) United States Patent
Zhang

(10) Patent No.: US 12,495,138 B2
(45) Date of Patent: Dec. 9, 2025

(54) VIDEO CODING METHOD AND APPARATUS, COMPUTING DEVICE, STORAGE MEDIUM, AND PROGRAM PRODUCT

(71) Applicant: Tencent Technology (Shenzhen) Company Limited, Shenzhen (CN)

(72) Inventor: Tao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 18 days.

(21) Appl. No.: 18/673,163

(22) Filed: May 23, 2024

(65) Prior Publication Data

US 2024/0314292 A1 Sep. 19, 2024

Related U.S. Application Data

(63) Continuation of application No. PCT/CN2023/122197, filed on Sep. 27, 2023.

(30) Foreign Application Priority Data

Sep. 29, 2022 (CN) .......................... 202211197925.0

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/157* (2014.11);
(Continued)

(58) Field of Classification Search
CPC .. H04N 19/103; H04N 19/119; H04N 19/157; H04N 19/172; H04N 19/182; H04N 19/186; H04N 19/146; H04N 19/176
See application file for complete search history.

(56) References Cited

U.S. PATENT DOCUMENTS

2015/0189302 A1 7/2015 Pu et al.
2015/0281703 A1 10/2015 Zou et al.
(Continued)

FOREIGN PATENT DOCUMENTS

CN 115118964 A 9/2022

OTHER PUBLICATIONS

Tencent Technology, ISR, PCT/CN2023/122197, Dec. 18, 2023, 3 pgs.
(Continued)

*Primary Examiner* — Nam D Pham
(74) *Attorney, Agent, or Firm* — Morgan, Lewis & Bockius LLP

(57) ABSTRACT

A video coding method is performed by a computing device, and the method includes: dividing a to-be-coded video frame image into a plurality of coding units; and for each coding unit, performing the following operations: determining color composition of the coding unit, the color composition comprising a quantity of colors comprised in the coding unit, further comprising: clustering a color of each pixel in the coding unit, to determine a type of the color comprised in the coding unit; and generating a color index table based on the type of the color comprised in the coding unit, wherein a quantity of color indexes comprised in the color index table corresponds to the quantity of colors; and in response to that the quantity of colors is less than or equal to a preset color quantity threshold, determining a coding mode of the coding unit to be a palette coding mode.

20 Claims, 6 Drawing Sheets

(51) Int. Cl.
    *H04N 19/157*     (2014.01)
    *H04N 19/172*     (2014.01)
    *H04N 19/182*     (2014.01)
    *H04N 19/186*     (2014.01)

(52) U.S. Cl.
    CPC ......... *H04N 19/172* (2014.11); *H04N 19/182* (2014.11); *H04N 19/186* (2014.11)

(56) References Cited

U.S. PATENT DOCUMENTS

| | | | |
|---|---|---|---|
| 2015/0341643 A1 | 11/2015 | Xu et al. | |
| 2015/0381994 A1 | 12/2015 | Yu et al. | |
| 2021/0051336 A1* | 2/2021 | Chao | H04N 19/174 |

OTHER PUBLICATIONS

Tencent Technology, Extended European Search Report, EP Patent Application No. 23870963.8, Aug. 1, 2025, 13 pgs.

Emad Badry et al., "Fast Algorithm with Palette Mode Skipping and Splitting Early Termination for HEVC Screen Content Coding", 2019 IEEE 62nd International Midwest Symposium on Circuits and Systems (MWSCAS), Aug. 2019, 4 pgs.

Hua Yang et al., "Non-CE8: Palette Mode CU Size Restriction", Joint Video Experts Team Oct. 1-11, 2019, Document: JVET-P0375, 5 p. (JVET) of ITU-T SG 16 WP 3 and ISO/IEC JTC 1/SC 29/WG 11, 16th Meeting: Geneva, CH, Oct. 1-11, 2019, Document: JVET-P0375, 5 pgs.

Rajan Joshi et al., "HEVC Screen Content Coding Test Model 7 (SCM 7)", Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, Document: JCTVC-W1014, 14 pgs.

Xun Guo et al., "RCE4: Test 1. Major-Color-Based Screen Content Coding", Joint Collaborative Team on Video Coding (JCT-VC) of ITU-T SG 16 WP 3 and ISO/IEC JTC 1/SC 29ZWG 11, 16$^{th}$ Meeting: San José, US, Jan. 9-17, 2014, Document: JCTVC-P0108, 12 pgs.

* cited by examiner

VIDEO CODING METHOD AND APPARATUS, COMPUTING DEVICE, STORAGE MEDIUM, AND PROGRAM PRODUCT

CROSS-REFERENCE TO RELATED APPLICATIONS

This application is a continuation application of PCT Patent Application No. PCT/CN2023/122197, entitled "VIDEO CODING METHOD AND APPARATUS, COMPUTING DEVICE, STORAGE MEDIUM, AND PROGRAM PRODUCT" filed on Sep. 27, 2023, which is based on and claims priority to Chinese Patent Application No. 202211197925.0, entitled "VIDEO CODING METHOD AND APPARATUS, COMPUTING DEVICE, STORAGE MEDIUM, AND PROGRAM PRODUCT" filed on Sep. 29, 2022, both of which are incorporated herein by reference in their entirety.

FIELD OF THE TECHNOLOGY

The present disclosure relates to the field of video coding and decoding technologies, and specifically, to a video coding method and a video coding apparatus to which the method is applied, and also to a computing device, a computer-readable storage medium, and a computer program product that are configured to implement the method.

BACKGROUND OF THE DISCLOSURE

With the development of computer applications, application scenarios such as a video conference, an online education, and a remote desktop becomes more common. In the application scenarios, a content form of a screen video is widely used, including a PowerPoint (PPT) presentation, a word document sharing, and the like. The screen video is a video obtained by capturing an image of screen display content of an electronic device such as a computer or a mobile phone. The screen video has many significant differences from a conventional natural video. For example, an image in the screen video has discontinuous tones, but an image in the natural video has continuous tones. In addition, the image in the screen video has characteristics such as including a small number of colors in a partial area, a large number of sharp boundaries, a large number of flat areas, high-contrast texts, and a large number of repeated textures.

Because of the inherent characteristics of the screen video, the International Organization for Standardization formulates a standard for screen compression, that is, a screen content coding (SCC). The SCC is an extended version based on a high efficiency video coding (HEVC) standard. In comparison with the HEVC, a tool suitable for the screen compression, such as an intra frame coding mode, an intra block copy (IBC) coding mode, and a palette coding mode, is added to the SCC standard. Therefore, the SCC can be used to code both the natural video and the screen video or a video with a similar characteristic. In a process of coding, an appropriate coding mode may be selected based on a characteristic of each coding unit of a to-be-coded video. In the mode, coding based on the palette mode is more complex, and not all coding units in the video are suitable for being coded by using the palette mode.

Therefore, a video coding method is expected to be provided. In the method, whether the coding unit in the video is suitable for use of the palette coding mode can be determined, and the mode is quickly skipped when the coding unit is not suitable for the palette coding mode, thereby improving coding efficiency.

SUMMARY

According to a first aspect of the present disclosure, a video coding method is provided, and the method includes: A computing device divides a to-be-coded video frame image into a plurality of coding units. For each coding unit in the plurality of coding units, the computing device performs the following operations. The computing device determines color composition of the coding unit, the color composition including a quantity of colors included in the coding unit, further including: clustering a color of each pixel in the coding unit, to determine a type of the color comprised in the coding unit; and generating a color index table based on the type of the color comprised in the coding unit, wherein a quantity of color indexes comprised in the color index table corresponds to the quantity of colors. The computing device determines a coding mode of the coding unit to be a palette coding mode in response to that the quantity of colors is less than or equal to a preset color quantity threshold.

According to a second aspect of the present disclosure, a computing device is provided, including a processor and a memory. The memory is configured to store computer executable instructions. The computer executable instructions are configured to: when being executed on the processor, enable the computing device to perform the video coding method according to the first aspect of the present disclosure and example embodiments thereof.

According to a third aspect of the present disclosure, a non-transitory computer-readable storage medium is provided. The computer-readable storage medium is configured to store computer executable instructions. The computer executable instructions are configured to: when being executed on a processor, enable the computing device to perform the video coding method according to the first aspect of the present disclosure and example embodiments thereof.

In the video coding method and apparatus according to some embodiments of the present disclosure, the computing device may predict and determine the coding mode for each to-be-coded unit in the to-be-coded video frame image. To be specific, the computing device quickly and accurately selects an appropriate coding mode or skips a specific coding mode (for example, only a coding mode of a coding unit suitable for use of the palette coding mode is determined as the palette coding mode) based on a condition of the color composition of the to-be-coded unit. In this way, a speed of video coding decision is improved, thereby significantly improving video coding efficiency.

BRIEF DESCRIPTION OF THE DRAWINGS

The following describes specific embodiments of the present disclosure in detail with reference to the accompanying drawings, so that more details, features and advantages of the present disclosure can be more fully recognized and understood. In the accompanying drawings.

Content shown in the accompanying drawings is merely illustrative. Therefore, the content is not necessarily drawn to scale. In addition, in the accompanying drawings, same or similar features are indicated by same or similar reference numerals.

DESCRIPTION OF EMBODIMENTS

The following descriptions provide specific details of example embodiments of the present disclosure, to enable a person skilled in the art to fully understand and implement the technical solutions described according to example embodiments of the present disclosure.

Coding unit: The coding unit (CU) is also referred to as a coding block. After a to-be-coded video is obtained, a coder first divides, based on brightness and chroma, a current frame of the video into a plurality of coding tree units (CTUs), and then, each coding tree unit is further divided into a plurality of coding units with same or different sizes. Each coding unit has a size, for example, an 8*8 pixel array, a 16*16 pixel array, or a 32*32 pixel array. Each coding unit may further be divided into one or more coding subunits as required.

Palette mode: The palette mode is also referred to as a color index mode. In this mode, a fixed color value is allocated to each pixel, and the color values are stored in a table, to establish a color index. The table storing the color values is also referred to as a palette. The palette mode is very efficient for an image block including a few colors. This is because, in comparison with conventional prediction and transformation processing on a block, in the palette mode, only a color index of each pixel needs to be transmitted for each pixel, and the image block can be reconstructed by a decoder by using the color index and the table storing the color values.

Figure 1:
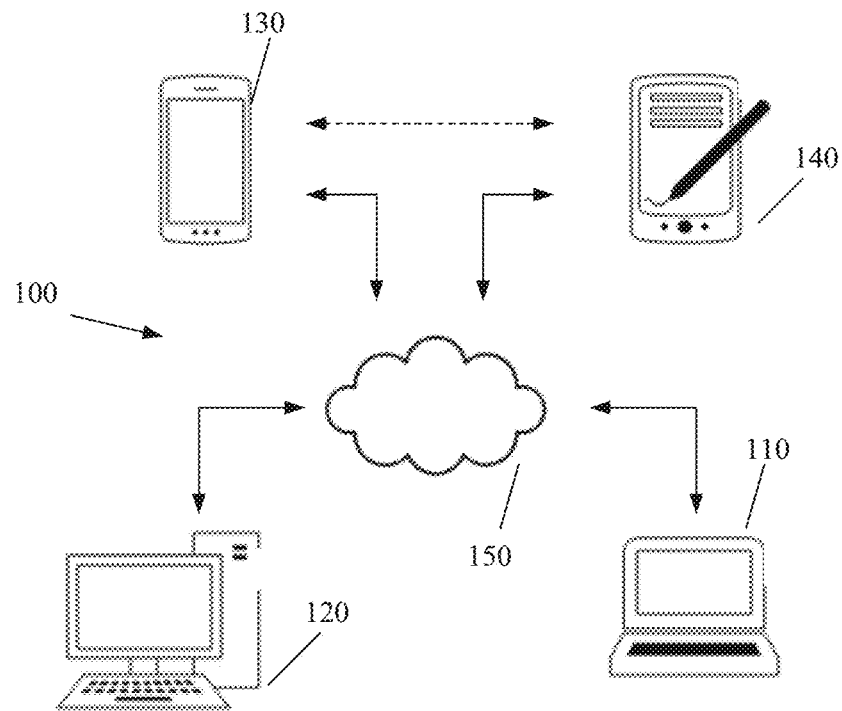
FIG. 1 schematically shows an application scenario to which video coding is applied.

FIG. 1 schematically shows an application scenario to which video coding is applied. As shown in FIG. 1, an application scenario 100 may include a plurality of devices, for example, a first device 110, a second device 120, a third device 130, and a fourth device 140. The devices may communicate with each other through a network 150. In the application scenario 100, the first device 110 and the second device 120 may perform unidirectional data transmission. For example, the first device 110 may encode video data (such as a video picture stream collected by the first device 110), to transmit the video data to the second device 120 through the network 150. Encoded video data is transmitted in a form of one or more encoded video code streams. The second device 120 may receive the encoded video data from the network 150, decode the encoded video data to restore the video data, and display a video picture based on the restored video data. The unidirectional data transmission is common in an application such as a media service. In addition, in the application scenario 100, the third device 130 and the fourth device 140 may perform bidirectional data transmission of encoded video data. The bidirectional data transmission may occur during a video conference, online education, remote desktop control, and the like. For the bidirectional data transmission, each of the third device 130 and the fourth device 140 may encode video data (such as a video picture stream collected by the devices), and transmit the video data to the other of the third device 130 and the fourth device 140 through the network 150. Each of the third device 130 and the fourth device 140 may further receive encoded video data transmitted by the other of the third device 130 and the fourth device 140, decode the encoded video data to restore video data, and display a video image on a display apparatus based on the restored video data.

The first device 110, the second device 120, the third device 130, and the fourth device 140 in FIG. 1 may be servers, personal computers, smart phones, laptop computers, tablet computers, media players, video conference devices, vehicle-mounted smart terminals, or any other devices that can provide a video service. This is not limited in the present disclosure. The network 150 may be any appropriate network for transmitting the encoded video data between the devices, and includes a wired and/or a wireless communication network. The communication network may be any appropriate communication network for exchanging data on a circuit-switching and/or packet-switching channel, and includes but is not limited to a telecommunication network, a local area network, a wide area network, and/or an Internet. This is also not limited in the present disclosure.

In the application scenario 100, the video data transmitted between the devices may be a video obtained by capturing an image of screen display content of the device. The image in the video may have one or more of the following characteristics: including discontinuous tones, a small number of colors in a partial area, a large number of sharp boundaries, a large number of flat areas, high-contrast texts, a large number of repeated textures, and the like. Certainly, in the application scenario 100, the video data transmitted between the devices may alternatively be a natural video whose image has continuous tones. The video coding method according to the present disclosure may be applied to both the screen video or a video with a similar characteristic and the natural video.

Figure 2:
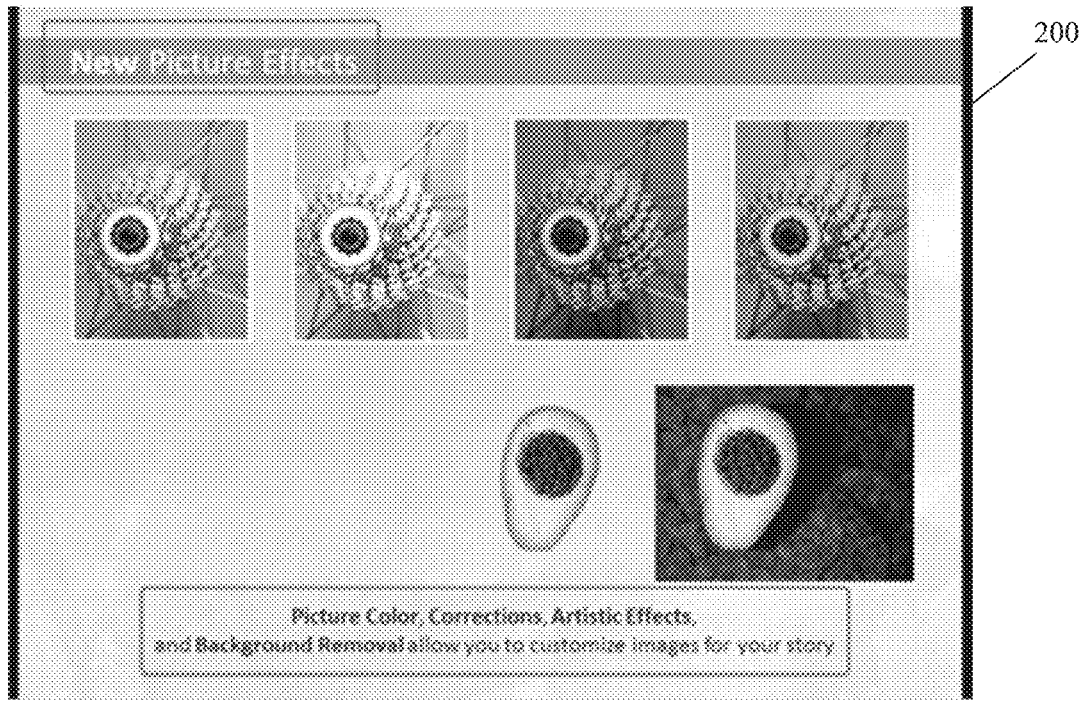
FIG. 2 schematically shows one frame of image in a to-be-coded video.

FIG. 2 schematically shows one frame of image in a to-be-coded video. An image 200 may be, for example, content that is on a device screen and that is shared with another party through screen sharing in a process of a video call, such as a document or a web page. It can be learned from FIG. 2 that, a quantity of colors in many areas of the image 200 is small. For example, content in a text area of the image 200 mainly includes two types of colors. In addition, there is a contrasting boundary in a plurality of areas of the image 200, such as a boundary between different color blocks and a boundary between each sub-image block and a background. In addition, there is also an area including many colors in the image 200, such as content displayed in each sub-image block. Therefore, when video coding is performed on the image 200, appropriate coding methods are to be selected for coding units corresponding to different areas, to obtain optimal video coding performance.

In a non-limiting example, in a related art, in a process in which a screen video or a video with a similar characteristic is coded, when an I-frame (I frame is an intra prediction frame) is coded, a conventional intra frame coding mode (including a DC mode, a planar mode, and a direction-based prediction mode, referred to as an intra frame prediction mode (IPM) for short herein), an IBC coding mode, and a palette coding mode may be sequentially traversed, to select a mode with smallest coding costs as an optimal coding mode for a current coding unit. In the coding modes, coding based on the palette coding mode is more complex, and not all coding units in the video are suitable for being coded by using the palette coding mode. Therefore, for a coding unit that is in the video and that is not suitable for use of the palette coding mode, the coding using the palette coding mode may be quickly skipped, to improve a speed of video coding decision, thereby improving user experience.

In some embodiments of the application, the present disclosure provides a video coding method, which may be performed by the computing device. Specifically, the method includes: dividing a to-be-coded video frame image into a plurality of coding units; and for each coding unit in the plurality of coding units, performing the following operations: determining color composition of the coding unit, the color composition including a quantity of colors included in the coding unit; and determining a coding mode of the coding unit based on the color composition of the coding unit. The coding mode in the determining a coding mode of the coding unit may include, but is not limited to one or more of the following plurality of coding modes: an inter frame coding mode, an intra frame coding mode, an intra block copy coding mode, and a palette coding mode.

Figure 3:
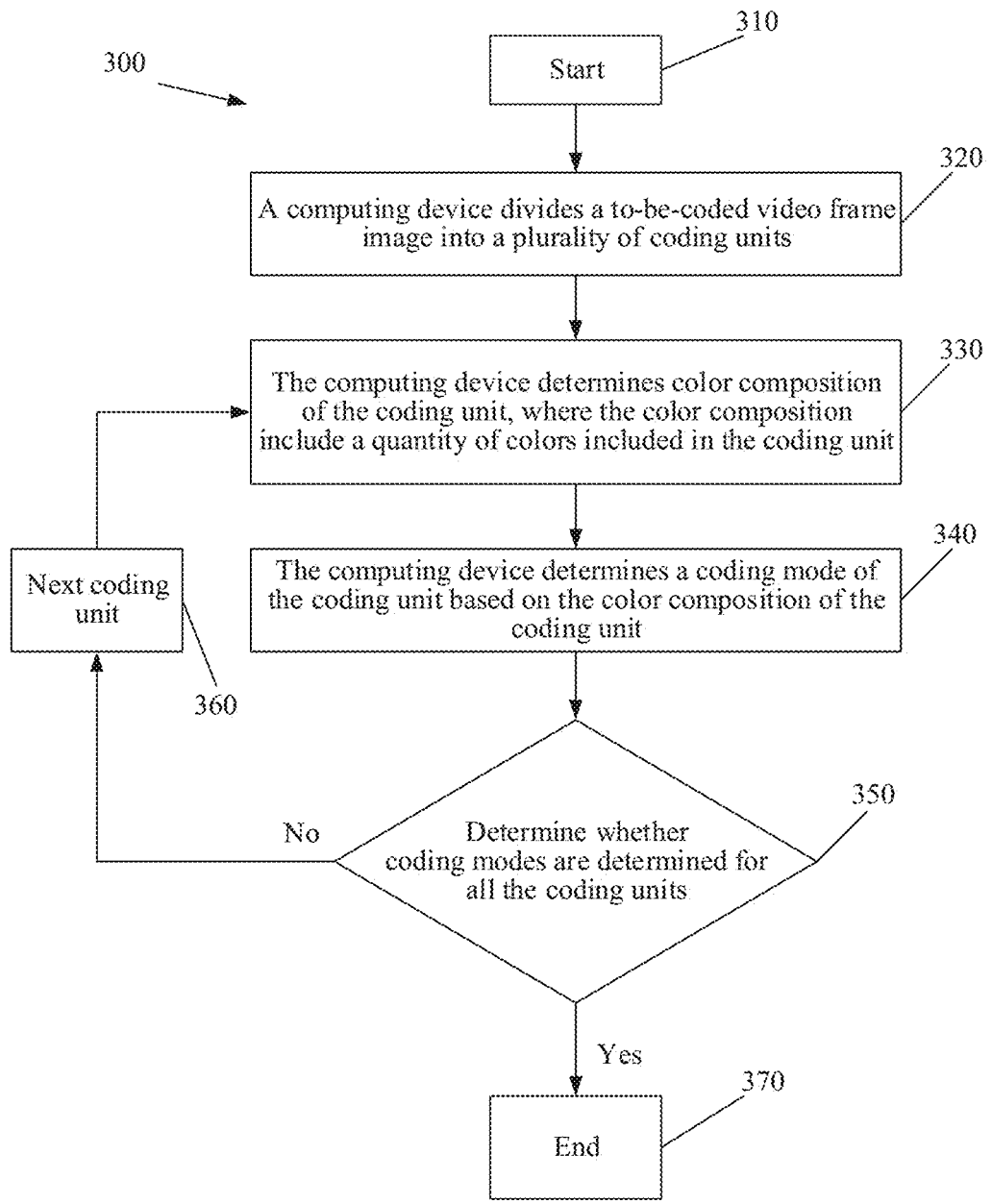
FIG. 3 schematically shows, in a form of a flowchart, a video coding method according to some example embodiments of the present disclosure.

FIG. 3 schematically shows, in a form of a flowchart, a video coding method according to some example embodiments of the present disclosure. As shown in FIG. 3, a video coding method 300 includes operations 310, 320, 330, 340, 350, 360, and 370.

To be specific, the video coding method 300 starts at operation 310. In operation 320, a computing device divides a to-be-coded video frame image into a plurality of coding units. In other words, the computing device divides one frame of to-be-coded image obtained in the to-be-coded video into the plurality of to-be-coded coding units. The to-be-coded video includes a plurality of frames of images. Therefore, after obtaining the to-be-coded video, the computing device sequentially obtains one frame of image from the plurality of frames of images and performs coding process. In the present disclosure, one frame of image obtained from the plurality of frames of images is also referred to as the to-be-coded video frame image, and unless otherwise stated, the term "to-be-coded video frame image" is always used in the following. For the to-be-coded video frame image, the computing device divides, based on brightness and chroma, the image into a plurality of coding tree units, and then, each coding tree unit is further divided into a plurality of coding units with same or different sizes. Each coding unit has a size, for example, an 8*8 pixel array, a 16*16 pixel array, or a 32*32 pixel array. Any appropriate manner for dividing the to-be-coded video frame image into the plurality of coding units may be applied to operation 320. This is not limited in the present disclosure. The computing device may include a coding apparatus.

As shown in FIG. 3, in the video coding method 300, the computing device performs operations 330 and 340 for each of the plurality of coding units:

Operation 330 is for determining color composition of the coding unit, where the color composition includes a quantity of colors included in the coding unit. In other words, in 330, that the computing device determines color composition of the coding unit includes the following S1 and S2:

S1: The computing device determines a color used by each pixel in the coding unit;

S2: The computing device determines the color composition of the coding unit based on the color of each pixel.

Any appropriate manner for determining the color composition of the coding unit may be applied to operation 330. This is not limited in the present disclosure.

The quantity of colors described in this application refers to a quantity of types of colors.

Figure 4:
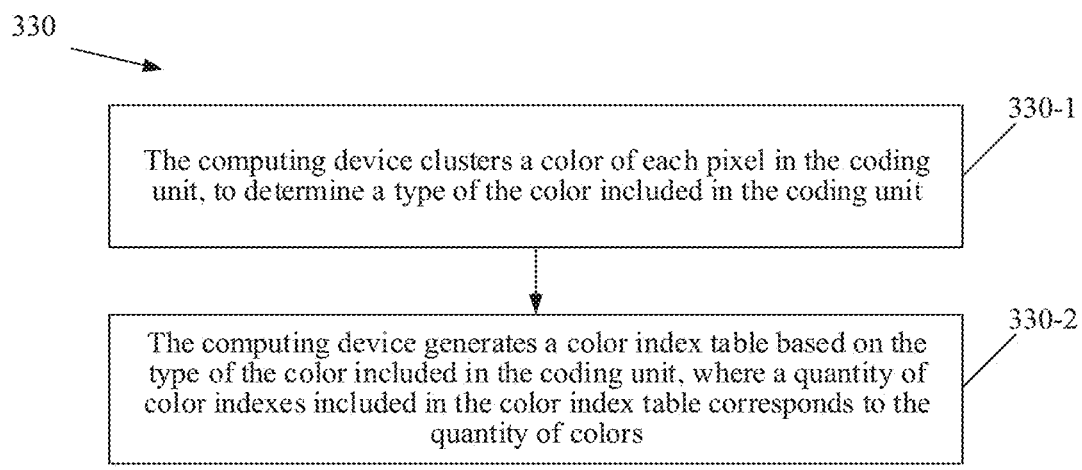
FIG. 4 shows more details of the video coding method shown in FIG. 3 according to some example embodiments of the present disclosure.

FIG. 4 further shows details of operation 330 in the video coding method 300 shown in FIG. 3 according to some example embodiments of the present disclosure. As shown in FIG. 4, according to some example embodiments of the present disclosure, operation 330 may include operations 330-1 and 330-2. Details are as follows.

In operation 330-1, the computing device clusters the color of each pixel in the coding unit, to determine a type of the color included in the coding unit;

In operation 330-2, the computing device generates a color index table based on the type of the color included in the coding unit, where a quantity of color indexes included in the color index table corresponds to the quantity of colors.

Operation 330-1 is essentially that the computing device determines the color of each pixel in the coding unit, and classifies the determined color of each pixel, to determine the type of color included in the coding unit. In some example embodiments of the present disclosure, a color coding value corresponding to each pixel in the coding unit may be determined based on a used color coding. The type of the color included in the coding unit may be determined based on the color coding value corresponding to each pixel in the coding unit. The color coding may be any appropriate color coding. For example, YUV color coding or RGB color coding known in the field of video coding and decoding technologies may be used.

In operation 330-2, the computing device may respectively assign, based on the determined type of the color included in the coding unit, corresponding index values to various colors, to generate a color index table for the colors. In the present disclosure, the term "quantity of colors" refers to a quantity of types of colors, in other words, a quantity of types of included colors. Therefore, the quantity of color indexes included in the color index table corresponds to the quantity of colors included in the coding unit. In the present disclosure, the color index table may also be referred to as a palette, which indexes each type of used color. Therefore, once the coding mode of the coding unit is determined as the palette coding mode, the color index table can be easily used in subsequent coding operations.

Figure 5:
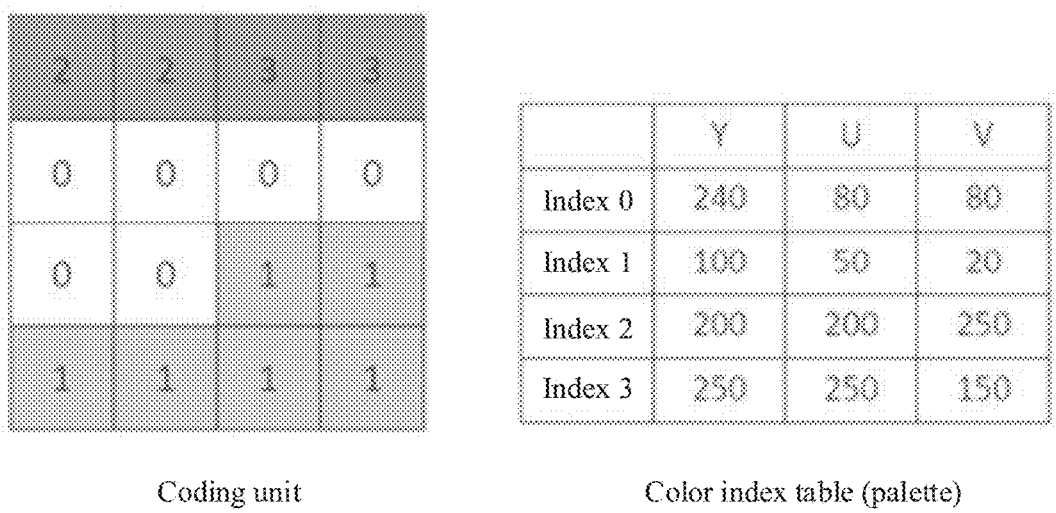
FIG. 5 schematically shows clustering of a color included in a coding unit and a color index table generated based on a result of the clustering.

FIG. 5 schematically shows clustering of a color included in a coding unit and a color index table generated based on a result of the clustering. As shown in a left figure in FIG. 5, the coding unit is a 4*4 pixel array. A color of each pixel may be determined based on YUV color coding, and distribution of the colors in all pixels of the coding unit is shown. In a table shown in a right figure of FIG. 5, a color index is established for each type of color, namely, an index 0, an index 1, an index 2, and an index 3, and each index corresponds to one type of color. For example, the index 0 represents a color whose Y, U, and V values are 240, 80, and 80 respectively in the coding unit. It can be learned from the left figure in FIG. 5 that, a number on each pixel corresponds to one color index value in the color index table on the right. It can be learned that, the color index table not only describes the type of the color used in the coding unit, but also records the quantity of colors included in the coding unit (which corresponds to the quantity of color indexes included in the color index table).

Still refer to FIG. 3. In operation 340, the video coding method 300 includes: The computing device determines the coding mode of the coding unit based on the color composition of the coding unit. The color composition of the coding unit may include various information, not only the quantity of colors included in the coding unit, but also quantities of pixels respectively corresponding to the colors included in the coding unit. This is not limited in the present disclosure.

Figure 6:
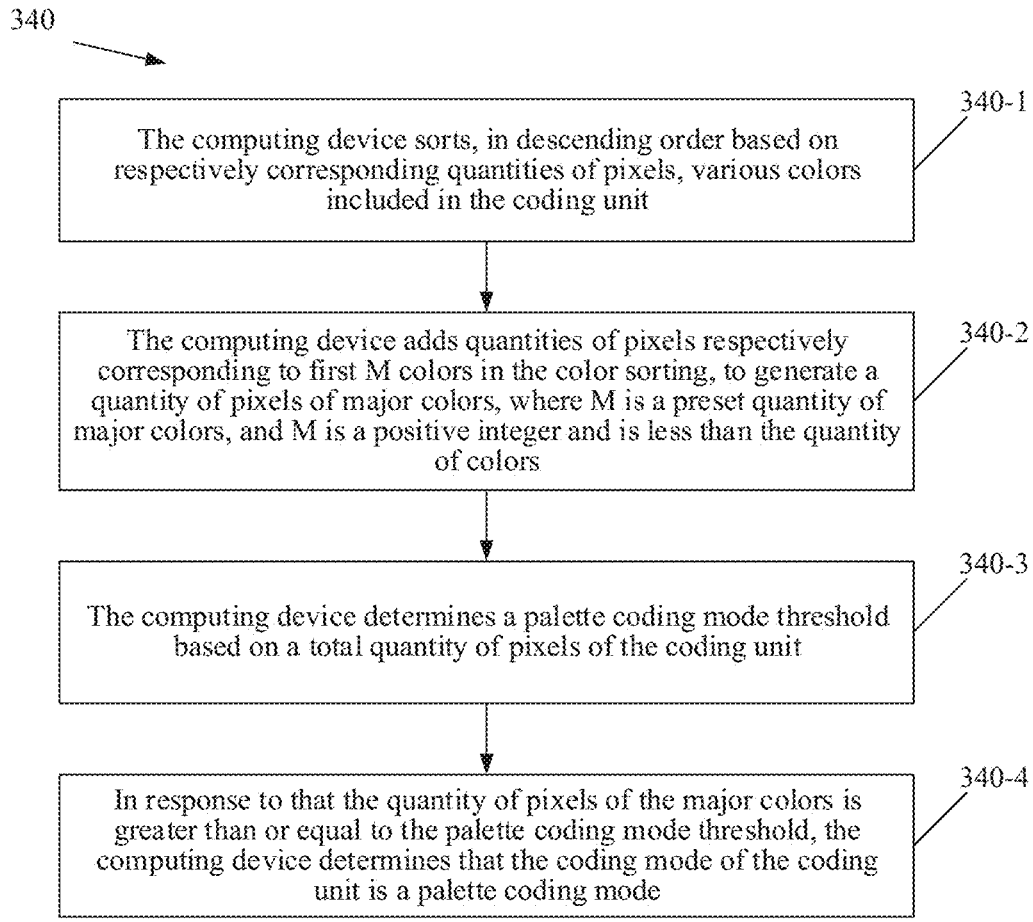
FIG. 6 shows more details of the video coding method shown in FIG. 3 according to some example embodiments of the present disclosure.

FIG. 6 further shows details of the video coding method shown in FIG. 3 according to some example embodiments of the present disclosure. As shown in FIG. 6, according to some example embodiments of the present disclosure, operation 340 may include operations 340-1, 340-2, 340-3, and 340-4. Details are as follows.

In operation 340-1, the computing device sorts, in descending order based on the respectively corresponding quantities of pixels, the colors included in the coding unit.

In operation 340-2, the computing device adds quantities of pixels respectively corresponding to first M colors in the color sorting, to generate a quantity of pixels of major colors, where M is a preset quantity of major colors, and M is a positive integer and is less than the quantity of colors.

In operation 340-3, the computing device determines a palette coding mode threshold based on a total quantity of pixels of the coding unit.

In operation 340-4, in response to that the quantity of pixels of the major colors is greater than or equal to the palette coding mode threshold, the computing device determines that the coding mode of the coding unit is the palette coding mode.

In the method shown in FIG. 6, the color composition of the coding unit further includes the quantities of pixels respectively corresponding to the colors included in the coding unit. In other words, the quantities of pixels respectively corresponding to the colors included in the coding unit may be counted respectively. Using the situation shown in FIG. 5 as an example, in the coding unit shown in FIG. 5, a quantity of pixels corresponding to the color index 0 is six, a quantity of pixels corresponding to the color index 1 is six, a quantity of pixels corresponding to the color index 2 is two, and a quantity of pixels corresponding to the color index 3 is two. In a case that the quantities of pixels respectively corresponding to the colors included in the coding unit are determined, operations 340-1, 340-2, 340-3, and 340-4 are performed.

Operation 340-1 is for sorting the colors based on the determined quantities of pixels corresponding to the colors. In the example embodiment shown in FIG. 6, the color sorting is established in descending order of the quantities of pixels. Still using the situation shown in FIG. 5 as an example, in the coding unit shown in FIG. 5, the color sorting established in descending order of the quantities of pixels may be: Index 0: 6; Index 1: 6; Index 2: 3; and Index 3: 2. However, it is also possible to establish a sequence in ascending order, which is described in detail below. In operation 340-2, the quantities of pixels corresponding to the major colors used more are accumulated, to generate the quantity of pixels of the major colors. The quantity of pixels of the major colors essentially reflects a proportion of the major colors in the colors included in the coding unit. In a non-limiting example, the quantity M of major colors may be preset based on an actual need and experience. M is a positive integer and is less than the quantity of colors included in the coding unit. When the quantity M of major colors is set, the quantities of pixels corresponding to the first M colors starting from a maximum value of the color sorting may be accumulated, to generate the quantity of pixels of the major colors. Still using the situation shown in FIG. 5 as an example, if the quantity M of major colors is preset to 2, the quantity of pixels corresponding to the color index 0: 6 and the quantity of pixels corresponding to the color index 1: 6 are selected from the color sorting and added, so that the quantity of pixels of the major colors in the example being 12 is obtained. Operation 340-3 is for determining the palette coding mode threshold based on the total quantity of pixels of the coding unit. Because the coding units obtained by dividing the to-be-coded video frame image have different sizes (in other words, pixel arrays with different sizes may be included), the palette coding mode threshold is associated with the total quantity of pixels of the coding unit.

Figure 7A:
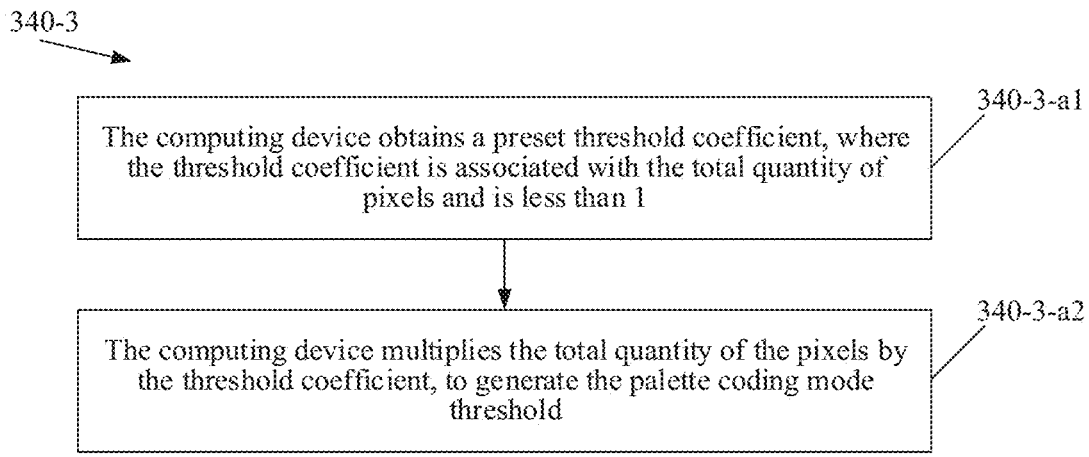
FIG. 7A and FIG. 7B respectively show more details of the video coding method shown in FIG. 6 respectively according to some example embodiments of the present disclosure.
Figure 7B:
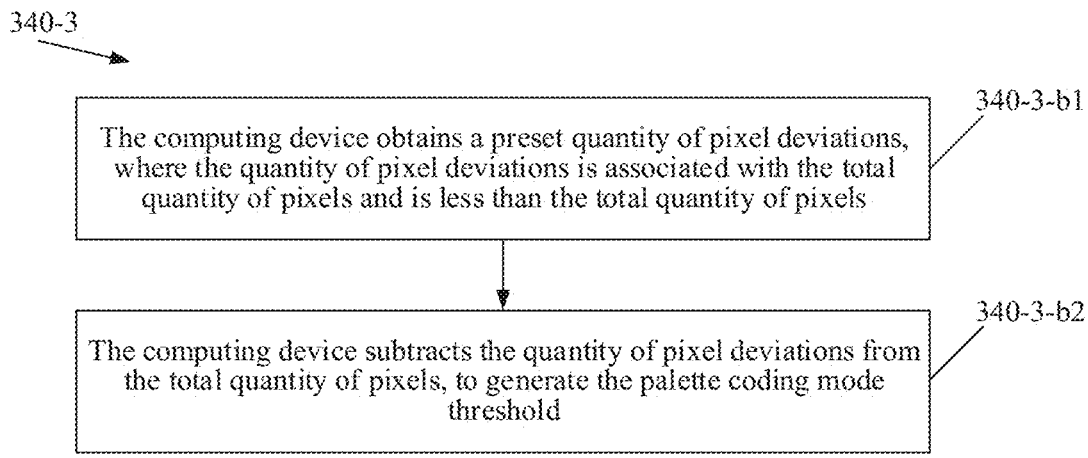

FIG. 7A and FIG. 7B further show details of the video coding method shown in FIG. 6 respectively according to some example embodiments of the present disclosure. As shown in FIG. 7A, according to some example embodiments of the present disclosure, operation 340-3 may include operations 340-3-a1 and 340-3-a2. Details are as follows.

In operation 340-3-a1, the computing device obtains a preset threshold coefficient, where the threshold coefficient is associated with the total quantity of pixels and is less than 1.

In operation 340-3-a2, the computing device multiplies the total quantity of the pixels by the threshold coefficient, to generate the palette coding mode threshold.

The threshold coefficient may be preset based on an actual need and experience, and is associated with the total quantity of pixels of the coding unit. In a non-limiting example, when the total quantity of pixels of the coding unit is 64, the threshold coefficient may be 0.7; when the total quantity of pixels of the coding unit is 256, the threshold coefficient may be 0.8; and when the total quantity of pixels of the coding unit is 1024, the threshold coefficient may be 0.8. In this way, the palette coding mode threshold corresponding to the coding unit can be obtained based on the total quantity of pixels of various coding units and the associated preset threshold coefficient.

In addition, as shown in FIG. 7B, according to some example embodiments of the present disclosure, operation 340-3 may include operations 340-3-b1 and 340-3-b2. Details are as follows.

In operation 340-3-b1, the computing device obtains a preset quantity of pixel deviations, where the quantity of pixel deviations is associated with the total quantity of pixels and is less than the total quantity of pixels.

In operation 340-3-b2, the computing device subtracts the quantity of pixel deviations from the total quantity of pixels, to generate the palette coding mode threshold.

The quantity of pixel deviations may also be preset based on an actual need and experience, and corresponds to the total quantity of pixels of the coding unit. For example, when the total quantity of pixels of the coding unit is 64, the quantity of pixel deviations may be 10; when the total quantity of pixels of the coding unit is 256, the quantity of pixel deviations may be 51; and when the total quantity of pixels of the coding unit is 1024, the quantity of pixel deviations may be 204. In this way, the palette coding mode threshold corresponding to the coding unit can be obtained based on the total quantity of pixels of the various coding units and the associated preset quantity of pixel deviations. In addition, in the example, the preset quantity of pixel deviations and the total quantity of pixels of the coding unit are used, so that the corresponding palette coding mode threshold can be obtained by using only a subtraction operation. The operation is simpler and therefore more efficient.

Still refer to FIG. 6. In operation 340-4, in response to that the quantity of pixels of the major colors is greater than or equal to the palette coding mode threshold, the computing device determines that the coding mode of the coding unit is the palette coding mode. The quantity of pixels of the major colors reflects the proportion of the major colors in the colors included in the coding unit. Therefore, when it is determined that the major colors account for a large proportion in the colors included in the coding unit (that is, a requirement of the palette coding mode threshold is satisfied), the coding mode of the coding unit may be determined as the palette coding mode.

It can be learned that, according to the method shown in FIG. 3, FIG. 4, FIG. 6, FIG. 7A, and FIG. 7B, each coding unit in the to-be-coded video frame image of the video may be predicted and determined, and only a coding mode of a coding unit suitable for use of the palette coding mode is determined as the palette coding mode. In this way, a speed of video coding decision is improved, thereby improving user experience.

In addition, in some example embodiments according to the present disclosure, the coding method shown in FIG. 6 may further include the following operation: in response to that the quantity of pixels of the major colors is less than the palette coding mode threshold, the computing device determines that the coding unit skips the palette coding mode.

Figure 8:
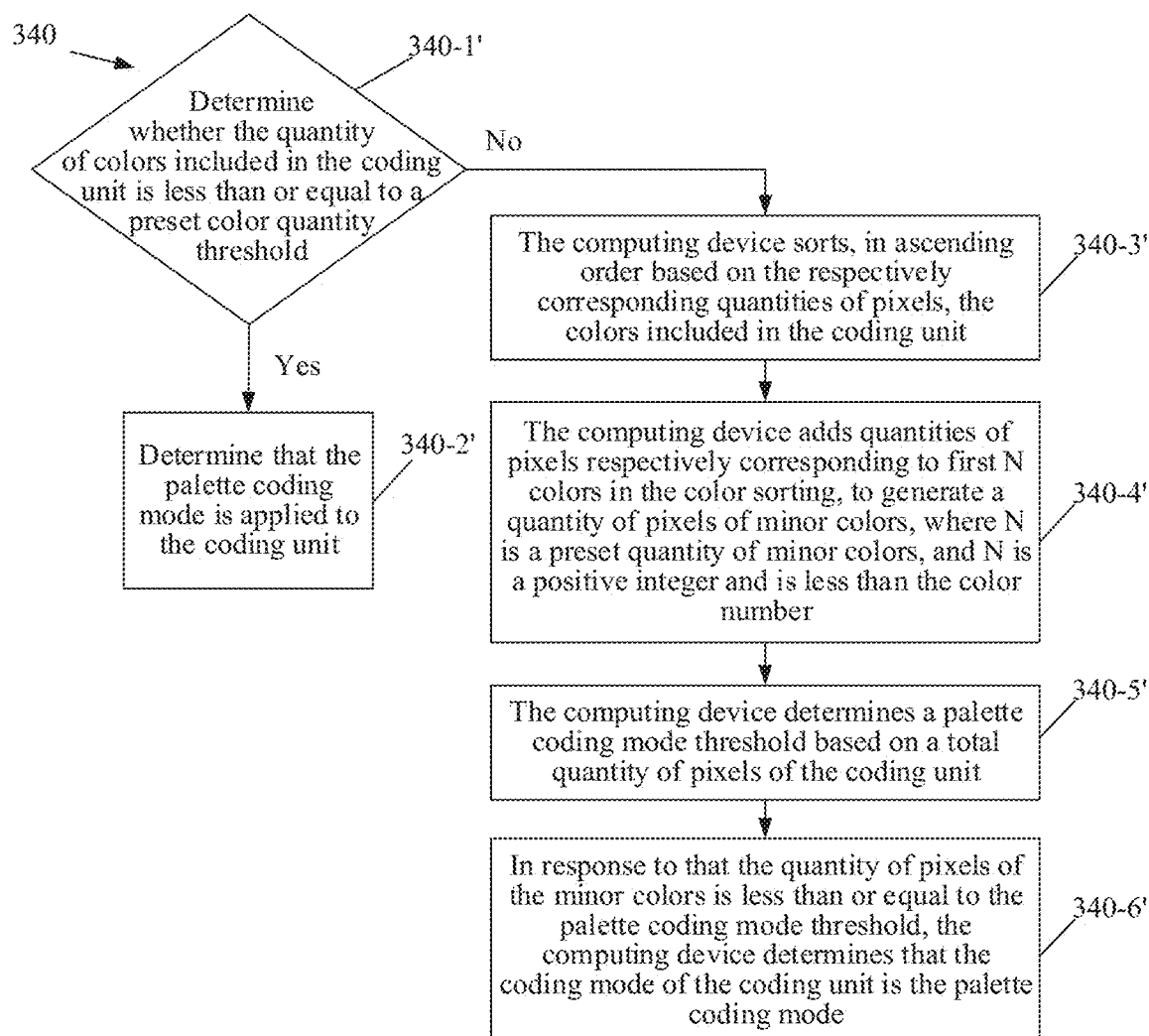
FIG. 8 shows more details of the video coding method shown in FIG. 3 according to some example embodiments of the present disclosure.

FIG. 8 further shows details of the video coding method shown in FIG. 3 according to some example embodiments of the present disclosure. As shown in FIG. 8, according to some example embodiments of the present disclosure, operation 340 may include operations 340-1', 340-2', 340-3', 340-4', 340-5', and 340-6'. The operations may be divided into two branches, namely, a first branch (including operations 340-1' and 340-2'), and a second branch (including operations 340-1', 340-3', 340-4', 340-5', and 340-6'). The following describes the method shown in FIG. 8 with reference to the two branches respectively.

In the first branch: in operation 340-1', the computing device determines whether the quantity of colors included in the coding unit is less than or equal to a preset color quantity threshold; and if yes, perform operation 340-2'; or if no, perform operation 340-3'. In operation 340-2', the computing device determines that the palette coding mode is applied to the coding unit, to be specific, in response to that the quantity of colors is less than or equal to the preset color quantity threshold, the computing device determines that the coding mode of the coding unit is the palette coding mode. The color quantity threshold may be preset based on an actual need and experience. For example, the color quantity threshold may be set to 2, which means that the coding unit includes only two types of colors, and therefore the palette coding mode is applicable. Therefore, when it is determined that the quantity of colors included in the coding unit is less than or equal to the preset color quantity threshold, the coding mode of the coding unit may be determined as the palette coding mode. It can be learned that, in the method shown in the branch, whether the coding unit is suitable for use of the palette coding mode can be more quickly determined based on the quantity of colors included in the coding unit and by using the preset color quantity threshold.

The second branch includes operations 340-1', 340-3', 340-4', 340-5', and 340-6'. Details are as follows.

In operation 340-1', the computing device determines whether the quantity of colors included in the coding unit is less than or equal to the preset color quantity threshold. In response to that the quantity of colors included in the coding unit is greater than the preset color quantity threshold, the computing device performs operations 340-3', 340-4', 340-5', and 340-6'.

In operation 340-3', the computing device sorts, in ascending order based on the respectively corresponding quantities of pixels, the colors included in the coding unit.

In operation 340-4', the computing device adds quantities of pixels respectively corresponding to first N colors in the color sorting, to generate a quantity of pixels of minor colors, where N is a preset quantity of minor colors, and N is a positive integer and is less than the quantity of colors.

In operation 340-5', the computing device determines the palette coding mode threshold based on the total quantity of pixels of the coding unit.

In operation 340-6', in response to that the quantity of pixels of the minor colors is less than or equal to the palette coding mode threshold, the computing device determines that the coding mode of the coding unit is the palette coding mode.

Operation 340-3' is similar to operation 340-1' described in detail before, and details are not described herein again. Operation 340-4' is for establishing a color sorting for the colors based on the determined quantities of pixels corresponding to the colors in the coding unit. However, in this example embodiment, the color sorting is established in ascending order based on the quantities of pixels. Using the situation shown in FIG. 5 as an example, in the coding unit shown in FIG. 5, the color sorting established in ascending order of the quantities of pixels may be: Index 3: 2, Index 2: 2, Index 0: 6, and Index 1: 6. In operation 340-4', the quantity of pixels corresponding to the minor colors used less is accumulated, to generate the quantity of pixels of the minor color. The quantity of pixels of the minor colors essentially reflects a proportion of the minor colors in the colors included in the coding unit. In a non-limiting example, the quantity N of minor colors may be preset based on an actual need and experience. N is a positive integer and is less than the quantity of colors included in the coding unit. When the quantity N of minor colors is set, the quantities of pixels corresponding to the first N colors starting from a minimum value of the color sorting may be sequentially accumulated, to generate the quantity of pixels of the minor colors. Still using the situation shown in FIG. 5 as an example, if the quantity N of minor colors is preset to 2, the value Index 3: 2 and the value Index 2: 2 are selected from the color sorting and added, so that the quantity of pixels of the minor colors in the example being 4 is obtained.

Operation 340-5' is for determining the palette coding mode threshold based on the total quantity of pixels of the coding unit. Similar to operation 340-3 described in detail before, in operation 340-5', the operations described in FIG. 7A and FIG. 7B may also be applied to determine the palette coding mode threshold, and details are not described herein again. However, because the minor colors included in the coding unit are considered in the second branch, both the threshold coefficient and the quantity of pixel deviations are different from those in the situation (as shown in FIG. 6) in which the major colors included in the coding unit are considered. In an explanatory example, in a case that the minor colors included in the coding unit are considered, when the palette coding mode threshold is determined based on the threshold coefficient, when the total quantity of pixels of the coding unit is 64, the threshold coefficient may be 0.3; when the total quantity of pixels of the coding unit is 256, the threshold coefficient may be 0.2; and when the total quantity of pixels of the coding unit is 1024, the threshold coefficient may be 0.2. When the palette coding mode threshold is determined based on the quantity of pixel deviations, when the total quantity of pixels of the coding unit is 64, the quantity of pixel deviations may be 54; when the total quantity of pixels of the coding unit is 256, the quantity of pixel deviations may be 205; and when the total quantity of pixels of the coding unit is 1024, the quantity of pixel deviations may be 820.

In operation 340-6', in response to that the quantity of pixels of the minor colors is less than or equal to the palette coding mode threshold, the computing device determines that the coding mode of the coding unit is the palette coding mode. The quantity of pixels of the minor colors reflects the proportion of the minor colors in the colors included in the coding unit. Therefore, when it is determined that the minor colors account for a small proportion in the colors included in the coding unit (that is, the requirement of the palette coding mode threshold is satisfied), the coding mode of the coding unit may be determined as the palette coding mode.

It can be learned that, according to the method shown in FIG. 3, FIG. 4, FIG. 7A, FIG. 7B, and FIG. 8, each coding unit in the to-be-coded video frame image of the video may be predicted and determined, and only a coding mode of a coding unit suitable for use of the palette coding mode is determined as the palette coding mode. In this way, the speed of video coding decision is improved, thereby improving user experience.

In some example embodiments according to the present disclosure, the coding method shown in FIG. 8 may further include the following operation: in response to that the quantity of pixels of the minor colors is greater than the palette coding mode threshold, the computing device determines that the coding unit skips the palette coding mode.

In addition, the operations included in the foregoing first branch (that is, operation 340-1' and 340-2') may alternatively be used in combination with the method shown in FIG. 6. In other words, whether the coding unit is suitable for use of the palette coding mode may be first determined based on the quantity of colors included in the coding unit and by using the preset color quantity threshold. When the quantity of colors included in the coding unit is greater than the color quantity threshold, operations 340-1', 340-2', 340-3', and 340-4' in the method shown in FIG. 6 are performed. Further, the method in the combination manner may further include the following operation: in response to that the quantity of pixels of the major colors is less than the palette coding mode threshold, the computing device determines that the coding unit skips the palette coding mode.

Still refer to FIG. 3. For the video coding method 300 in operation 350, whether the coding mode is determined for all the coding units is determined. If the coding mode is determined for all the coding units, the video coding method 300 ends at operation 370. If the coding mode is not determined for all the coding units, the video coding method 300 repeats operations 330 and 340 for a next coding unit (operation 360), to determine the coding mode for the coding unit. The video coding method 300 repeatedly performs operations 330 to 360 until the coding mode is determined for all the coding units, and then the video coding method 300 ends at operation 370.

It can be learned that, according to the method shown in FIG. 3, each coding unit in the to-be-coded video frame image of the video may be predicted and determined. To be specific, an appropriate coding mode is quickly and accurately selected or a specific coding mode is skipped (for example, only a coding mode of a coding unit suitable for use of the palette coding mode is determined as the palette coding mode) based on a condition of the color composition of the to-be-coded unit. In this way, the speed of video coding decision is improved, thereby significantly improving video coding efficiency.

Figure 9:
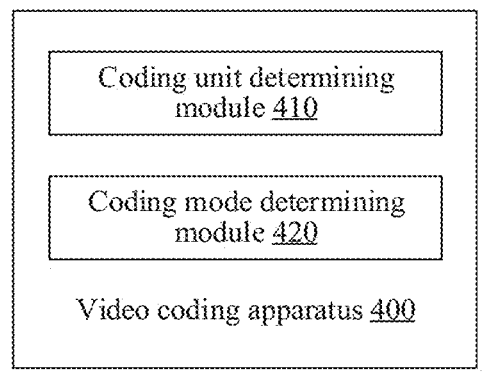
FIG. 9 schematically shows, in a form of a block diagram, a structure of a video coding apparatus according to some example embodiments of the present disclosure.

FIG. 9 schematically shows, in a form of a block diagram, a structure of a video coding apparatus according to some example embodiments of the present disclosure. A video coding apparatus 400 may be used in various devices shown in FIG. 1, and may be used in various scenarios described in the present disclosure. As shown in FIG. 9, the video coding apparatus 400 includes a coding unit determining module 410 and a coding mode determining module 420.

The coding unit determining module 410 is configured to divide a to-be-coded video frame image into a plurality of coding units. The coding mode determining module 420 is configured to determine color composition of the coding unit for each coding unit in the plurality of coding units, the color composition including a quantity of colors included in the coding unit, and determine a coding mode of the coding unit based on the color composition of the coding unit. The foregoing modules involve the foregoing operations 320, 330, 340, 350, and 360 described about FIG. 3, therefore details are not described herein again.

The foregoing modules described about FIG. 9 may be implemented in hardware or hardware combined with software and/or firmware. For example, the modules may be implemented as computer-executable code/instructions configured to be executed in one or more processors and stored in a non-transitory computer-readable storage medium. Alternatively, the modules may be implemented as hardware logic/circuit. For example, in some embodiments, one or more of the modules may be implemented together in a system on a chip (SoC). The SoC may include an integrated circuit chip (including a processor (for example, a central processing unit (CPU), a microcontroller, a microprocessor, a digital signal processor (DSP)), a memory, one or more communication interfaces, and/or one or more components in another circuit), and may execute received program code and/or include embedded firmware to perform a function in some embodiments.

Figure 10:
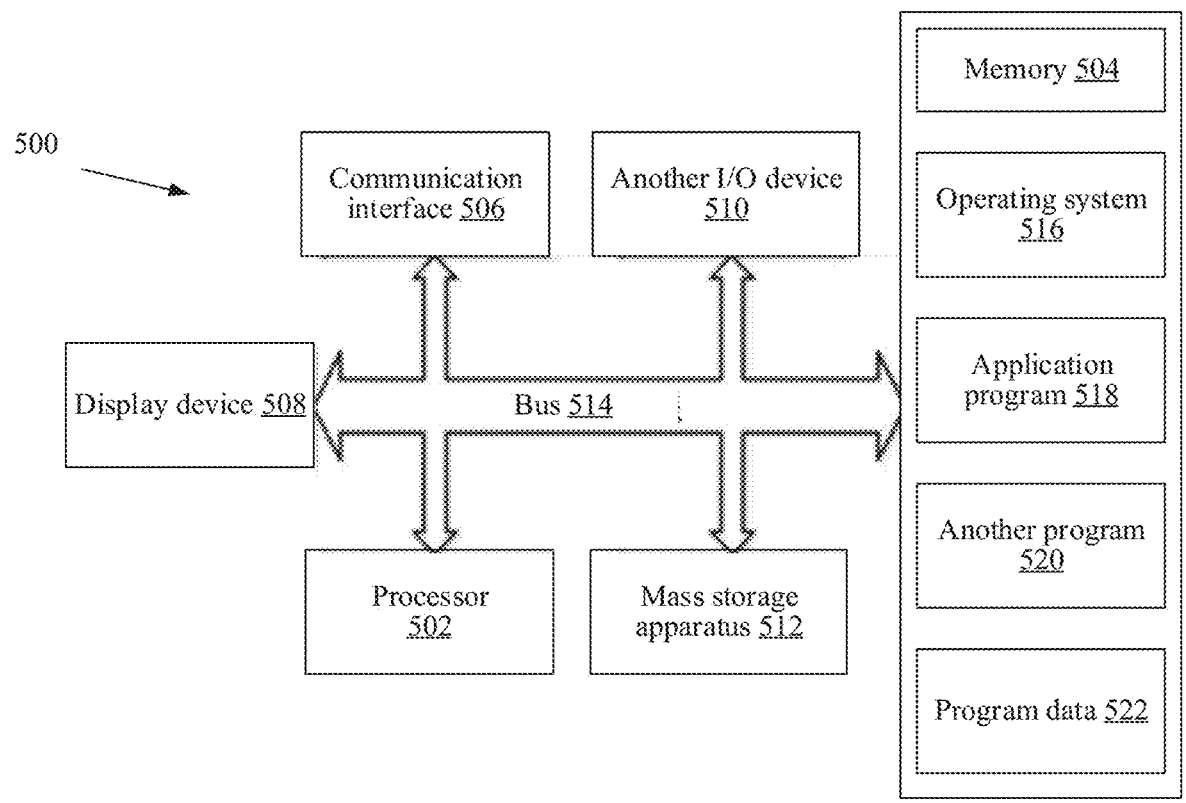
FIG. 10 schematically shows, in a form of a block diagram, a structure of a computing device according to some example embodiments of the present disclosure.

FIG. 10 schematically shows, in a form of a block diagram, a structure of a computing device 500 according to some embodiments of the present disclosure. The computing device 500 may be used in various application scenarios described in the present disclosure.

The computing device 500 may include at least one processor 502, a memory 504, (a plurality of) communication interface(s) 506, a display device 508, another input/output (I/O) device 510, and one or more mass storage apparatus 512 that are capable of being connected and communicating with each other through, for example, a system bus 514 or another appropriate manner.

The processor 502 may be a single processing unit or a plurality of processing units, and all processing units may include a single or a plurality of computing units or a plurality of cores. The processor 502 may be implemented as one or more microprocessors, microcomputers, microcontrollers, digital signal processors, central processing units, state machines, logic circuits, and/or any device that manipulates a signal based on operating instructions. Aside from other capabilities, the processor 502 may be configured to obtain and execute computer-readable instructions, such as program code of an operating system 516, program code of an application program 518, and program code of another program 520 that are stored in the memory 504, the mass storage device 512, or another computer-readable medium.

The memory 504 and the mass storage device 512 are examples of a computer-readable storage medium for storing instructions that are executable by the processor 502 to perform the various functions described above. For example, the memory 504 may generally include both a volatile memory and a non-volatile memory (for example a random access memory (RAM) and a read-only memory (ROM)). In addition, the mass storage device 512 may generally include a hard disk drive, a solid state drive, a removable medium, an external and removable drive, a memory card, a flash memory, a floppy disk, an optical disk (such as a compact disc (CD) and a digital versatile disc (DVD)), a storage array, a network attached storage, a storage area network, and the like. The memory 504 and the mass storage device 512 may both be collectively referred to as a computer-readable memory or the computer-readable storage medium herein, and may be a non-transitory medium that can store computer-readable, processor-executable program instructions as computer-executable code. The computer-executable code may be executed by the processor 502 as a particular machine configured to implement the operations and functions described in example embodiments of the present disclosure.

A plurality of program modules may be stored on the mass storage device 512. The program modules include the operating system 516, one or more application programs 518, another application 520, and program data 522, and all of them may be executed by the processor 502. Examples of such application program or program modules may include, for example, computer program logic (such as computer-executable code or instructions) for implementing the following components/functions: a coding unit determining module 410 and a coding mode determining module 420.

Although illustrated in FIG. 10 as being stored in the memory 504 of the computing device 500, the coding unit determining module 410, the coding mode determining module 420, or a part of them may be implemented by any form of computer-readable medium accessible by the computing device 500. As used herein, a meaning of the term "computer-readable medium" used herein includes at least two types of computer-readable media, that is, a computer storage medium and a communication medium. The computer storage medium includes a volatile and a non-volatile medium and a removable and a non-removable medium that are implemented through any method or technology for storing information. The information may be computer-readable instructions, a data structure, a program module, or other data. The computer storage medium includes, but is not limited to, an RAM, a ROM, an electrically erasable programmable read-only memory (EEPROM), a flash memory or another memory technology, a compact disc read-only memory (CD-ROM), a digital versatile disk (DVD), another optical storage apparatus, a cassette tape, a magnetic tape, a magnetic disk storage apparatus or another magnetic storage device, or any other non-transmission medium that can be used for storing information to be accessed by the computing device. In contrast, the communication medium may specifically implement the computer-readable instructions, the data structure, the program module, or the other data in a modulated data signal such as a carrier wave or another transmission mechanism. The computer storage medium defined in the present disclosure does not include the communication medium.

The computing device 500 may also include the one or more communication interfaces 506, to exchange data with another device through a network, a direct connection, or the like. The communication interface 506 may facilitate communication in various networks and protocol types, including a wired network (such as a local area network (LAN) and a cable) and a wireless network (such as a wireless local area network (WLAN), a cellular, a satellite), the Internet, and the like. The communication interface 506 may also provide communication with an external storage device (not shown) such as in a storage array, a network attached storage, a storage area network, and the like.

In some examples, the computing device 500 may also include the display device 508 such as a display, to display information and an image. The another I/O device 510 may be a device that receives various inputs from a target object and provides various outputs to the target object, including but not limited to a touch input device, a gesture input device, a camera, a keyboard, a remote control, a mouse, a printer, an audio input/output device, and the like.

The present disclosure further provides a computer program product or computer program. The computer program product or the computer program includes computer instructions. The computer instructions are stored in a computer-readable storage medium. A processor of a computing device reads the computer instructions from the computer-readable storage medium. The processor executes the computer instructions, so that the computing device performs the method that is provided in the foregoing various implementations and that is for determining an associated application or for determining recommended content.

Terms used in the present disclosure are merely used to describe example embodiments in the present disclosure and are not intended to limit the present disclosure. As used herein, "a", "an", and "the" of singular forms are also intended to include plural forms, unless otherwise indicated in the context clearly. Terms "comprise" and "include", when used in the present disclosure, refer to the existence of described features but do not exclude the existence of one or more other features or add one or more other features. As used herein, term "and/or" includes any and all combinations of one or more of the associated listed items. Although terms "first", "second", "third", and the like may be used herein to describe various features, the features are not limited by the terms. The terms are merely used to distinguish one feature from another feature.

Unless otherwise defined, all terms (including technical terms and scientific terms) used in the present disclosure have the same meaning as commonly understood by a person of ordinary skill in the art to which the present disclosure belongs. Terms such as those defined in commonly used dictionaries are to be interpreted as have meanings consistent with the meanings in a related art and/or the context of this specification, and are not to be interpreted in an idealized or extremely formalized sense, unless expressively so defined in the present disclosure.

In the descriptions of this specification, descriptions of terms such as "an embodiment", "some embodiments", "an example", "a specific example", or "some examples" mean that a specific feature, a structure, a material, or a characteristic described with reference to the embodiment or the example is included in at least one embodiment or example of the present disclosure. In this specification, schematic descriptions of the foregoing terms are not necessarily directed at the same embodiment or example. Furthermore, the specific feature, structure, material, or characteristic described may be combined in an appropriate manner in any one or more embodiments or examples. In addition, in a case of no contradiction, a person skilled in the art may integrate and combine the different embodiments or examples with the features of the different embodiments or examples described in this specification.

Various technologies are described in the general context of software, hardware, component, or program module herein. Generally, these modules include a routine, a program, an object, an element, a component, a data structure, and the like for executing a particular task or implementing a particular abstract data type. Terms "module," "function," and "component" generally mean software, firmware, hardware, or a combination thereof. The technical features described herein are platform-independent, meaning that the technologies can be implemented on various computing platforms with various processors.

The logic and/or operations shown in the flowcharts or described in any other manner herein, for example, a list that may be considered as executable instructions used to implement logical functions, may be specifically implemented in any computer-readable medium to be used by an instruction execution system, an apparatus, or a device (for example, a computer-based system, a system including a processor, or another system that can obtain an instruction from the instruction execution system, apparatus, or device and execute the instruction) or to be used by combining the instruction execution systems, apparatuses, or devices. In addition, operations of the method shown in the flowcharts or described in any other manner herein are merely examples and do not mean that the operations of the method illustrated or described necessarily be performed based on the operations shown or described. In contrast, the operations shown in the flowcharts or described in any other manner herein may be performed in a different order than in the present disclosure, or may be performed simultaneously. In addition, as required, the method shown in the flowcharts or described in any other manner herein may also include other additional operations.

Parts of the present disclosure may be implemented by using hardware, software, firmware, or a combination thereof. In the foregoing implementations, a plurality of operations or methods may be implemented by using software or firmware that are stored in a memory and are executed by an appropriate instruction execution system. For example, if hardware is used for implementation, implementation may be performed by any one of the following technologies well known in the art or a combination thereof: a discrete logic circuit of a logic gate circuit for implementing a logic function for a data signal, an application-specific integrated circuit having a suitable combined logic gate circuit, a programmable gate array, a field programmable gate array, and the like.

A person of ordinary skill in the art may understand that all or some the operations of the method in the foregoing embodiments may be implemented by a program instructing relevant hardware. The program may be stored in a computer-readable storage medium. When the program is executed, one or a combination of the operations of the method embodiments are performed.

In example implementations of the present disclosure, data such as a to-be-coded video and a to-be-coded image may be involved. When the example embodiments involving such data described in the present disclosure are applied to a specific product or technology, user permission or user agreement is required, and collection, use and processing of relevant data need to comply with relevant laws, regulations and standards of relevant countries and regions.

Although the present disclosure is described in detail with reference to some example embodiments, the present disclosure is not intended to be limited to the specific forms described herein. In contrast, the scope of the present disclosure is limited only by the appended claims. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A video coding method, performed by a computing device, the method comprising:
   dividing a to-be-coded video frame image into a plurality of coding units; and
   for each coding unit in the plurality of coding units, performing the following operations:
      determining color composition of the coding unit, the color composition comprising a quantity of colors comprised in the coding unit, further comprising:
         clustering a color of each pixel in the coding unit, to determine a type of the color comprised in the coding unit; and
         generating a color index table based on the type of the color comprised in the coding unit, wherein a quantity of color indexes comprised in the color index table corresponds to the quantity of colors; and
      in response to that the quantity of colors is less than or equal to a preset color quantity threshold, determining a coding mode of the coding unit to be a palette coding mode.

2. The method according to claim 1, wherein the color composition further comprises quantities of pixels respectively corresponding to various colors comprised in the coding unit, and the determining a coding mode of the coding unit to be a palette coding mode comprises:
   sorting the colors comprised in the coding unit in a descending order based on the respectively corresponding quantities of pixels;
   generating a quantity of pixels of major colors by adding quantities of pixels respectively corresponding to first M colors in the color sorting, wherein M is a preset quantity of major colors, and M is a positive integer and is less than the quantity of colors;
   determining a palette coding mode threshold based on a total quantity of pixels of the coding unit; and
   in response to that the quantity of pixels of the major colors is greater than or equal to the palette coding mode threshold, determining that the coding mode of the coding unit is the palette coding mode.

3. The method according to claim 2, wherein the determining a palette coding mode threshold based on a total quantity of pixels of the coding unit comprises:

obtaining a preset threshold coefficient, wherein the threshold coefficient is associated with the total quantity of pixels and is less than 1; and multiplying the total quantity of the pixels by the threshold coefficient, to generate the palette coding mode threshold.

4. The method according to 2, wherein the determining a palette coding mode threshold based on a total quantity of pixels of the coding unit comprises:

obtaining a preset quantity of pixel deviations, wherein the quantity of pixel deviations is associated with the total quantity of pixels and is less than the total quantity of pixels; and subtracting the quantity of pixel deviations from the total quantity of pixels, to generate the palette coding mode threshold.

5. The method according to claim 1, wherein the clustering a color of each pixel in the coding unit, to determine a type of the color comprised in the coding unit comprises:

determining a color coding value corresponding to each pixel in the coding unit based on a used color coding; and determining the type of the color comprised in the coding unit based on the color coding value corresponding to each pixel in the coding unit.

6. The method according to claim 1, wherein the video coding method further comprises:

in response to that the quantity of colors is greater than the preset color quantity threshold, skipping the coding unit from the palette coding mode.

7. The method according to claim 1, wherein the color composition further comprises quantities of pixels respectively corresponding to various colors comprised in the coding unit, and the video coding method further comprises:

in response to that the quantity of colors is greater than the color quantity threshold, performing, by the computing device, the following operations:

sorting the colors comprised in the coding unit in an ascending order based on the respectively corresponding quantities of pixels;

generating a quantity of pixels of minor colors by adding quantities of pixels respectively corresponding to first N colors in the color sorting, wherein N is a preset quantity of minor colors, and N is a positive integer and is less than the quantity of colors;

determining a palette coding mode threshold based on a total quantity of pixels of the coding unit; and in response to that the quantity of pixels of the minor colors is less than or equal to the palette coding mode threshold, determining that the coding mode of the coding unit is the palette coding mode.

8. A computing device, comprising a processor and a memory, the memory being configured to store computer executable instructions, and the computer executable instructions, when being executed on the processor, causing the computing device to perform a video coding method including:

dividing a to-be-coded video frame image into a plurality of coding units; and for each coding unit in the plurality of coding units, performing the following operations:

determining color composition of the coding unit, the color composition comprising a quantity of colors comprised in the coding unit, further comprising:

clustering a color of each pixel in the coding unit, to determine a type of the color comprised in the coding unit; and generating a color index table based on the type of the color comprised in the coding unit, wherein a quantity of color indexes comprised in the color index table corresponds to the quantity of colors; and in response to that the quantity of colors is less than or equal to a preset color quantity threshold, determining a coding mode of the coding unit to be a palette coding mode.

9. The computing device according to claim 8, wherein the color composition further comprises quantities of pixels respectively corresponding to various colors comprised in the coding unit, and the determining a coding mode of the coding unit to be a palette coding mode comprises:

sorting the colors comprised in the coding unit in a descending order based on the respectively corresponding quantities of pixels;

generating a quantity of pixels of major colors by adding quantities of pixels respectively corresponding to first M colors in the color sorting, wherein M is a preset quantity of major colors, and M is a positive integer and is less than the quantity of colors;

determining a palette coding mode threshold based on a total quantity of pixels of the coding unit; and in response to that the quantity of pixels of the major colors is greater than or equal to the palette coding mode threshold, determining that the coding mode of the coding unit is the palette coding mode.

10. The computing device according to claim 9, wherein the determining a palette coding mode threshold based on a total quantity of pixels of the coding unit comprises:

obtaining a preset threshold coefficient, wherein the threshold coefficient is associated with the total quantity of pixels and is less than 1; and multiplying the total quantity of the pixels by the threshold coefficient, to generate the palette coding mode threshold.

11. The computing device according to claim 9, wherein the determining a palette coding mode threshold based on a total quantity of pixels of the coding unit comprises:

obtaining a preset quantity of pixel deviations, wherein the quantity of pixel deviations is associated with the total quantity of pixels and is less than the total quantity of pixels; and subtracting the quantity of pixel deviations from the total quantity of pixels, to generate the palette coding mode threshold.

12. The computing device according to claim 8, wherein the clustering a color of each pixel in the coding unit, to determine a type of the color comprised in the coding unit comprises:

determining a color coding value corresponding to each pixel in the coding unit based on a used color coding; and determining the type of the color comprised in the coding unit based on the color coding value corresponding to each pixel in the coding unit.

13. The computing device according to claim 8, wherein the video coding method further comprises:

in response to that the quantity of colors is greater than the preset color quantity threshold, skipping the coding unit from the palette coding mode.

14. The computing device according to claim 8, wherein the color composition further comprises quantities of pixels respectively corresponding to various colors comprised in the coding unit, and the video coding method further comprises: in response to that the quantity of colors is greater than the color quantity threshold, performing, by the computing device, the following operations:

sorting the colors comprised in the coding unit in an ascending order based on the respectively corresponding quantities of pixels;

generating a quantity of pixels of minor colors by adding quantities of pixels respectively corresponding to first N colors in the color sorting, wherein N is a preset quantity of minor colors, and N is a positive integer and is less than the quantity of colors;

determining a palette coding mode threshold based on a total quantity of pixels of the coding unit; and in response to that the quantity of pixels of the minor colors is less than or equal to the palette coding mode threshold, determining that the coding mode of the coding unit is the palette coding mode.

15. A non-transitory computer-readable storage medium storing computer executable instructions, the computer executable instructions, when executed by a processor of a computing device, causing the computing device to perform a video coding method including:

dividing a to-be-coded video frame image into a plurality of coding units; and for each coding unit in the plurality of coding units, performing the following operations:

determining color composition of the coding unit, the color composition comprising a quantity of colors comprised in the coding unit, further comprising:

clustering a color of each pixel in the coding unit, to determine a type of the color comprised in the coding unit; and generating a color index table based on the type of the color comprised in the coding unit, wherein a quantity of color indexes comprised in the color index table corresponds to the quantity of colors; and in response to that the quantity of colors is less than or equal to a preset color quantity threshold, determining a coding mode of the coding unit to be a palette coding mode.

16. The non-transitory computer-readable storage medium according to claim 15, wherein the color composition further comprises quantities of pixels respectively corresponding to various colors comprised in the coding unit, and the determining a coding mode of the coding unit to be a palette coding mode comprises:

sorting the colors comprised in the coding unit in a descending order based on the respectively corresponding quantities of pixels;

generating a quantity of pixels of major colors by adding quantities of pixels respectively corresponding to first M colors in the color sorting, wherein M is a preset quantity of major colors, and M is a positive integer and is less than the quantity of colors;

determining a palette coding mode threshold based on a total quantity of pixels of the coding unit; and in response to that the quantity of pixels of the major colors is greater than or equal to the palette coding mode threshold, determining that the coding mode of the coding unit is the palette coding mode.

17. The non-transitory computer-readable storage medium according to claim 16, wherein the determining a palette coding mode threshold based on a total quantity of pixels of the coding unit comprises:

obtaining a preset threshold coefficient, wherein the threshold coefficient is associated with the total quantity of pixels and is less than 1; and multiplying the total quantity of the pixels by the threshold coefficient, to generate the palette coding mode threshold.

18. The non-transitory computer-readable storage medium according to claim 16, wherein the determining a palette coding mode threshold based on a total quantity of pixels of the coding unit comprises:

obtaining a preset quantity of pixel deviations, wherein the quantity of pixel deviations is associated with the total quantity of pixels and is less than the total quantity of pixels; and subtracting the quantity of pixel deviations from the total quantity of pixels, to generate the palette coding mode threshold.

19. The non-transitory computer-readable storage medium according to claim 15, wherein the clustering a color of each pixel in the coding unit, to determine a type of the color comprised in the coding unit comprises:

determining a color coding value corresponding to each pixel in the coding unit based on a used color coding; and determining the type of the color comprised in the coding unit based on the color coding value corresponding to each pixel in the coding unit.

20. The non-transitory computer-readable storage medium according to claim 15, wherein the video coding method further comprises:

in response to that the quantity of colors is greater than the preset color quantity threshold, skipping the coding unit from the palette coding mode.

\* \* \* \* \*